United States Patent Office 2,943,997
Patented July 5, 1960

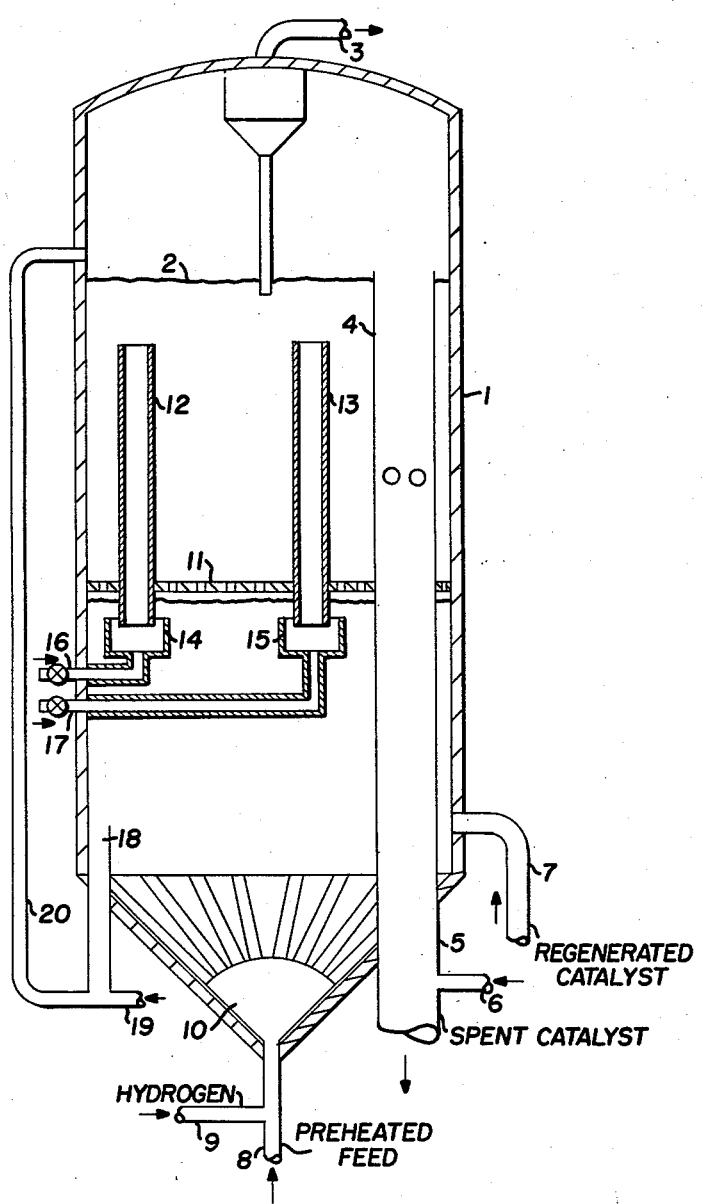
FIGURE-I
Donald D. MacLaren
Walter G. May  Inventors

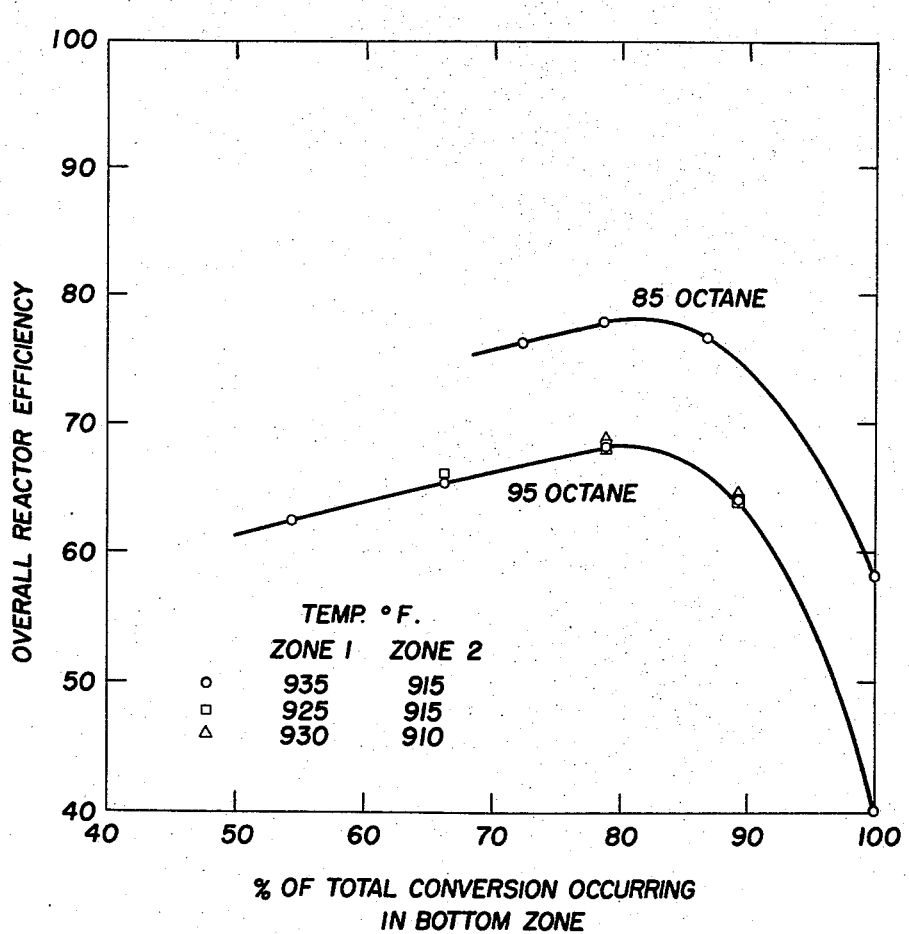
FIGURE-II

2,943,997

FLUID HYDROFORMING PROCESS AND APPARATUS

Donald D. MacLaren, Scotch Plains, and Walter G. May, Union, N.J., assignors to Esso Research and Engineering Company, a corporation of Delaware Filed Mar. 1, 1957, Ser. No. 643,342

6 Claims. (Cl. 208—64)

This invention relates to an improved process and apparatus for the fluid hydroforming of hydrocarbons and relates more particularly to the use of a single high pressure drop horizontal baffle located critically in the reactor to improve reactor efficiency. Additionally, it relates to the withdrawal of a small stream of solids from the bottom of said baffled reactor to prevent the accumulation in the lower section of the reactor of coarse material which is not entrained through said baffle.

The process of fluid hydroforming of naphthas has become well known. Although used primarily to secure octane improvement of gasoline, it also finds use in the production of aromatics and hydrogen. The feed stock to this process is typically paraffinic, naphthenic, sweet or sour naphthas, cracked naphthas, or coker naphthas boiling in a range within the limits of about 100 to 430° F. Under the influence of temperature, pressure and a hydrofining catalyst and in the presence of hydrogen, reactions such as dehydrogenation, dehydroisomerization, dehydrocyclization, isomerization, etc., occur to alter the hydrocarbon structure of the feed. Some other subsidiary reactions such as desulfurization and olefin saturation also occur.

In carrying out the hydroforming reaction, a fluidized bed of hydroforming catalyst is maintained in a reaction zone at a temperature in the range of 750° to 1000° F. The vaporized feed is introduced in the bed and converted. The reaction occurs in an atmosphere of hydrogen. Recycled hydrogen recovered from the products is customarily used. To provide the necessary heat for the endothermic reaction, the naphtha feed is preheated up to temperatures as high as 1000° F., and the recycled hydrogen is preheated up to a maximum of about 1200° F. Some of the reaction heat is also supplied by circulating catalyst from the regenerator where carbon is continuously burned from the catalyst. Customarily, pressures may range from 50 to 250 p.s.i.g., with higher pressures in this range being preferred. For some cases, higher pressures about to 1000 p.s.i.g., may be used. Feed rates may range from 0.1 to 5.0 v./v./hr. (volume of liquid feed/volume of catalyst/hour), and recycle gas rates may range from 2000 to 7000 s.c.f. per barrel of feed with the recycle gas usually containing over 50% hydrogen.

In hydroforming, catalysts such as molybdena on alumina, platinum on alumina, cobalt molybdate on alumina, or chromia on alumina may be used. The preferred catalyst in the fluid process is molybdena on alumina because of its ruggedness toward catalyst poisons and regenerations.

In fluid hydroforming continuous external regeneration facilities are used wherein catalyst withdrawn from the reactor is oxidatively regenerated at temperatures in the range of 1050 to 1300° F. Heat may also be supplied to the reactor and removed from the regenerator by other direct or indirect heat exchange means.

The present invention is particularly directed to solve problems encountered when large size commercial reactors of above about 5 feet in diameter are used, e.g. 10–25 feet in diameter. Catalyst efficiency in these large units has been low, in the order of 40% at the 95 research octane number clear level. This 40% efficiency is based on results obtained in a 15 inch diameter pilot unit reactor which has arbitrarily been given a rating of 100%. In this pilot unit octane number was varied by changing space velocity while temperature, recycle gas rate, catalyst/oil ratio, catalyst composition and feed stock composition were kept constant. Thus efficiency in a commercial unit is defined as the ratio of the required space velocity to that predicted from pilot plant operation after correcting for all the above factors. Thus a 40% efficiency indicates that the space velocity (weight rate of feed per hour per pound of catalyst in the reactor) for the commercial unit is only four tenths of that in the aforesaid pilot unit.

This low catalyst efficiency obtained in the large commercial units can be explained as caused by the backmixing of solids and accompanying gas which tends to limit conversion. The present invention, however, is not dependent upon the particular theory used to explain this low efficiency and undoubtedly a number of factors are involved.

Baffles have been proposed in the past as a means of increasing catalyst efficiency in fluid solids systems. However, conventional low pressure drop, high free area baffles have been unsatisfactory in that the gases rising in such a reactor have a tendency to flow toward the center of the catalyst bed and the solids to flow to the outside of the bed thus creating poor contacting conditions. This type of baffle is a very poor distributor of gas and very erratic and non-uniform upward gas flow and downward solids flow are observed.

According to the present invention it has been determined (1) that high pressure drop baffles e.g. 1–2.5 p.s.i., should be used to obtain good gas redistribution (and that each baffle should have one or more downcomers to provide for solids return to the zone below), (2) That in most cases only one baffle can be used because for the necessary head in the downcomers a considerable height of catalyst bed is required, (3) That a small stream of solids should be withdrawn from the bottom of the lower zone and circulated to the upper zone to prevent the accumulation of coarse material in the lower zone and (4) That for maximum efficiency about 80% of the total conversion should occur in the first or lower zone and that this is attained by locating the baffle approximately 35% of the way up through the catalyst bed. It should be noted that the fact that only one baffle can be used makes the matter of its location very important if the maximum advantages are to be obtained from the baffle.

The present invention will be more fully understood by reference to the accompanying drawings.

Figure I describes diagrammatically a preferred hydroforming system embodying the advantages of the present invention. Only the hydroforming reactor is shown since the invention resides wholly therein and since the complete hydroforming reactor-regenerator system is well known in the art.

Figure II is a graph illustrating the optimum split in conversion between the top and bottom zone of a single baffle hydroformer.

Reaction vessel 1 contains a bed of fluidized hydroforming catalyst having an upper level 2. Gaseous reaction products pass from vessel 1 via line 3, after entrained solids have been removed in a cyclone separator system. From these reaction products a gaseous stream for recycle to the reactor containing preferably over 50% hydrogen is separated. The remaining products are then further treated as desired by fractionation, blending, etc.

To remove carbonaceous and contaminating deposits from the hydroforming catalyst a portion of the fluidized bed is withdrawn through internal stripper 4 and is passed through line 5 to regeneration facilities not shown. Inert gas or steam is supplied to the bottom of said stripper 4 through line 6. Hot regenerated catalyst is returned to the reactor 1 through line 7, preferably in a ratio of catalyst to oil in the range of 0.8 to 1.6 pounds per catalyst per pound of oil.

Preheated feed is supplied through line 8 and heated hydrogen or recycle gas is supplied through line 9 to a cone shaped or other good bottom distributor 10. This distributor uniformly distributes these gasiform reactants across the bottom of the reactor so as to obtain an even fluidization of the catalyst bed.

According to this invention a single high pressure drop baffle 11 having a pressure drop across it of from 1 to 2.5 p.s.i. is located at a distance 25 to 50% of the way through the catalyst bed, preferably about 35%. Two or more downcomers 12 and 13 are provided to return solids from the upper zone to the lower zone and to vary the internal catalyst to oil circulation rate. Each downcomer is equipped with a separately aerated seal pot, 14 and 15 supplied with recycle gas or steam by lines 16 and 17 respectively. Downward flow is obtained when the seal pots are aerated and flow is stopped when such gas supply is discontinued. The present downcomer system serves to prevent gas from by-passing up the downcomers and permits recycle gas or steam stripping of reaction products from the downflowing catalyst. By proper adjustment of temperatures in the two zones internal catalyst to oil ratios can be kept less than 10, so that less than 1000 s.c.f./b. of recycle gas are needed for stripping the internally circulating catalyst. Additionally this gas does not need to be specially prepared as all of its heat will be utilized in such bottom and top zones.

The proposed system can also be operated with no internal catalyst circulation. However, if the same temperatures are maintained in the two zones, more than the optimum amount of conversion occurs in the first zone. This lowers the overall efficiency. The conversion in the first zone may be kept at the optimum of about 80% by increasing the temperature difference between zones. However, for the same total catalyst hold-up, this leads to excessive first zone temperatures, e.g. greater than 950° F. Temperatures this high at the feed inlet tend to degrade naphthenes and cause a loss of gasoline yield.

Also, according to this invention from the bottom zone a small stream of solids is withdrawn through withdrawal well 18 and is carried up by recycle gas or steam, supplied through line 19 to line 20 and is discharged back into the reactor above the catalyst bed level 2. This circulation is necessary because the gas velocity in the reactor is too low to entrain the coarsest particles of catalyst. Consequently, all of the coarse material will accumulate in the bottom stage unless some special precaution is taken to prevent this. Since, if it does accumulate, it will not be regenerated, over a period of time there will accumulate a large amount of completely deactivated catalyst in the lower zone. The withdrawal of only a very small stream from such lower zone will effectively prevent this, e.g. 0.2 to 5.0 pounds of catalyst per pound of oil supplied to the reactor.

Turning now to Figure II a graph is presented illustrating the optimum location of the single high pressure drop baffle and of the benefits obtained by its optimum location. The graph presents the effect of the relative amount of conversion occurring in each zone upon catalyst efficiency. According to the graph, catalyst efficiency reaches a maximum when about 80% of the total conversion occurs in the first zone. This is independent of total conversion level, the curves reaching a peak at the same percent of total conversion to be realized in the first zone for 85 octane as for 95 octane product level attained. To limit internal catalyst to oil ratios to less than 10, preferably 5–10, the second zone is 20–30° F. lower in temperature than the first, e.g. 955°–920° F. in the lower zone and 925°–900° F. in the upper zone. Thus while only about 20% of the reaction occurs in the second zone, its lower temperature requires more than half the total catalyst. For these conditions the baffle should be located about 35% of the way through the bed to give the optimum 80% conversion indicated in Figure II. After design of the reactor the temperatures in the two zones should be adjusted in service to give the desired 80% conversion in the lower zone.

It can thus be seen that this invention provides an improved method of increasing catalyst efficiency in large size commercial fluid hydroforming reactors. Applicants have thus disclosed that better gas distribution and prevention of backmixing of gas and catalyst can be obtained with a single high pressure drop horizontal baffle optimumly located 35% of the way up through the catalyst bed and protected against the accumulation of coarse solids in such bottom zone by the circulation of a small stream from such bottom zone to above the catalyst bed.

*Example 1*

A 200° F. to 350° F. mixed Louisiana virgin naphtha is hydroformed to 95 research clear octane number. The catalyst comprises 10 wt. percent molybdic oxide supported on an activated alumina support stabilized by the inclusion of 2.0 wt. percent silica therein. Reactor pressure is 200 p.s.i.g. and the temperature of the lower catalyst bed is 935° F. and of the upper catalyst bed 915° F. The depth of lower catalyst bed is 36% of that of the total catalyst bed and the pressure drop across the grid between the catalyst beds is 1.0 p.s.i.

3,000 s.c.f./b. of recycle gas at a temperature of 1200° F. is mixed with the naphtha feed and sent to the reaction zone. An additional 1000 s.c.f./b. of recycle gas is supplied to the downcomers to strip reaction products from descending catalyst. Space velocity of the naphtha feed is 0.32 pound of oil per hour per pound of catalyst in the reactor. External catalyst circulation to the regenerator is 1.2 pounds of catalyst per pound of oil, the circulation of catalyst down the downcomers or internal circulation is 7.5 pounds of catalyst per pound of oil and that through the transfer line from the lower catalyst bed to above the upper catalyst bed is 4.0 pounds of catalyst per pound of oil. In addition, 4.7 pounds of catalyst per pound of oil are entrained by the rising vapors, and carried from the lower bed to the upper bed.

*Example 2*

The same feed as in Example 1 is processed to 95 octane level with the same catalyst without circulation of catalyst through downcomers from the upper fluid bed to the lower fluid bed. Only 65% conversion of feed in the lower zone rather than the optimum 80% is attainable when no downcomers are used because of the desirability of limiting conversion temperatures to about 950° F. Reactor pressure is 200 p.s.i.g. and the temperature of the lower catalyst bed is 955° F. and that of the upper catalyst bed is 915° F. The depth of the lower catalyst bed is 25% of that of the total catalyst bed and the pressure drop across the grid between the catalyst beds is 1.0 p.s.i.

4,000 s.c.f./b. of recycle gas at a temperature of 1200° F. is mixed with the naphtha feed and sent to the reaction zone. Space velocity of the naphtha feed is 0.32 pound of oil per pound of catalyst in the reactor. External catalyst circulation to the regenerator is 1.2 pounds of catalyst per pound of oil, circulation through the transfer line from the lower catalyst bed to the upper catalyst bed is 0.2 pound of catalyst per pound of oil, and entrainment of catalyst with the rising vapors through the baffle in the reactor is 1.0 pound of catalyst per pound of oil.

It will be understood that this invention is not limited to the specific examples which have been offered merely as illustrations and that modifications may be made without departing from the spirit of this invention.

What is claimed is:

1. In a fluidized catalyst hydroforming process the improvement which comprises increasing catalyst efficiency by introducing vaporized feed and recycle gas well distributed horizontally into the bottom of a vertical reactor zone containing two vertically spaced dense fluidized beds of finely divided hydroforming catalyst particles separated from each other by a high, 1–2.5 p.s.i., pressure drop separation zone, continuously supplying highly active catalyst to the lower fluid bed and continuously withdrawing a stream of catalyst from the upper fluid bed for regeneration, circulating a stream of catalyst from the upper fluid bed to the lower fluid bed, circulating another smaller external stream from the lower fluid bed to the upper bed, maintaining said lower fluid bed zone at a temperature of 920 to 955° F. and said upper fluid bed zone at a temperature of 900 to 925° F., and locating the separation zone for the particular temperatures of the upper and lower zones and catalyst circulation rates so as to obtain about 80% of the total conversion of reactants in the lower fluid bed zone.

2. The process of claim 1 in which the circulation of high activity catalyst to the reactor zone is in the range of 0.8 to 1.6 pounds of catalyst per pound of oil, the circulation of catalyst from the upper fluid bed to the lower fluid bed is in the range of 5.0 to 10.0 pounds of catalyst per pound of oil and the external circulation of catalyst from the lower catalyst bed to the upper catalyst bed is in the range of 0.2 to 5.0 pounds of catalyst per pound of oil.

3. The process as in claim 1 in which the separation zone is located so that the depth of the lower fluid bed is 25–50% of that of the total fluid bed in the reactor zone.

4. The process of claim 1 in which the circulation of high activity catalyst to the reactor zone is about 1.2 pounds of catalyst per pound of oil the circulation of catalyst from the upper fluid bed to the lower fluid bed is about 7.5 pounds of catalyst per pound of oil and the external circulation of catalyst from the lower catalyst bed to the upper catalyst bed is about 4.0 pounds of catalyst per pound of oil.

5. A fluid hydroforming vessel which comprises distributor means in the bottom of the reaction vessel for introducing recycle gas and vaporized feed uniformly over the bottom area of the reactor; a high 1–2.5 p.s.i. pressure drop, horizontal grid located 25–50% of the way up through the total fluid bed in the reactor; downcomers with separately aerated seal pots extending from above the grid to the region below the grid for the passage of catalyst therethrough, a conduit means connecting the lower fluid bed to the upper fluid bed for passing catalyst from such lower bed to the upper bed, a catalyst withdrawal stripper receiving catalyst from the upper fluid bed; an inlet into the lower part of the vessel for the supply of high activity catalyst to the reactor, and an outlet at the top of the vessel for passing vaporous products out from the reactor.

6. The hydroforming vessel as defined in claim 5 in which the reactor is above about 5 feet in diameter.

References Cited in the file of this patent

UNITED STATES PATENTS

| | | |
|---|---|---|
| 2,697,684 | Hemminger et al. | Dec. 21, 1954 |
| 2,702,267 | Keith | Feb. 15, 1955 |
| 2,737,476 | Hardy et al. | Mar. 6, 1956 |
| 2,758,959 | Nicolai | Aug. 14, 1956 |